US011256986B2

(12) United States Patent
Tang et al.

(10) Patent No.: US 11,256,986 B2
(45) Date of Patent: Feb. 22, 2022

(54) SYSTEMS AND METHODS FOR TRAINING A NEURAL KEYPOINT DETECTION NETWORK

(71) Applicant: Toyota Research Institute, Inc., Los Altos, CA (US)

(72) Inventors: Jiexiong Tang, Mountain View, CA (US); Rares A. Ambrus, San Francisco, CA (US); Vitor Guizilini, Santa Clara, CA (US); Sudeep Pillai, Santa Clara, CA (US); Hanme Kim, San Jose, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 62 days.

(21) Appl. No.: 16/836,355

(22) Filed: Mar. 31, 2020

(65) Prior Publication Data
US 2021/0089836 A1    Mar. 25, 2021

Related U.S. Application Data

(60) Provisional application No. 62/904,916, filed on Sep. 24, 2019.

(51) Int. Cl.
*G06N 3/08* (2006.01)
*G06K 9/00* (2006.01)
(Continued)

(52) U.S. Cl.
CPC ............ *G06N 3/08* (2013.01); *B60W 60/0015* (2020.02); *G06K 9/00718* (2013.01);
(Continued)

(58) Field of Classification Search
CPC ....... G06N 3/08; G06N 3/04; B60W 60/0015; G06K 9/00718; G06K 9/00791;
(Continued)

(56) References Cited

U.S. PATENT DOCUMENTS 9,418,317 B2     8/2016   Soatto et al.
2018/0268220 A1*  9/2018   Lee .......................... G06K 9/34
(Continued)

OTHER PUBLICATIONS

Brachmann et al., "Neural-Guided RANSAC: Learning Where to Sample Model Hypotheses," 2019, found at https://arxiv.org/pdf/1905.04132.pdf.
(Continued)

*Primary Examiner* — Utpal D Shah
(74) *Attorney, Agent, or Firm* — Christopher G. Darrow; Darrow Mustafa PC

(57) ABSTRACT

Systems and methods for training a neural keypoint detection network are disclosed herein. One embodiment extracts a portion of an input image; applies a transformation to the portion of the input image to produce a transformed portion of the input image; processes the portion of the input image and the transformed portion of the input image using the neural keypoint detection network to identify one or more candidate keypoint pairs between the portion of the input image and the transformed portion of the input image; and processes the one or more candidate keypoint pairs using an inlier-outlier neural network, the inlier-outlier neural network producing an indirect supervisory signal to train the neural keypoint detection network to identify one or more candidate keypoint pairs between the portion of the input image and the transformed portion of the input image.

20 Claims, 6 Drawing Sheets

(51) Int. Cl.
 G06K 9/62 (2006.01)
 G06K 9/20 (2006.01)
 G06N 3/04 (2006.01)
 B60W 60/00 (2020.01)
 G06K 9/46 (2006.01)
(52) U.S. Cl.
 CPC ....... G06K 9/00791 (2013.01); G06K 9/2054 (2013.01); G06K 9/4652 (2013.01); G06K 9/6232 (2013.01); G06K 9/6256 (2013.01); G06K 9/6265 (2013.01); G06K 9/6267 (2013.01); G06N 3/04 (2013.01)
(58) Field of Classification Search
 CPC .. G06K 9/2054; G06K 9/4652; G06K 9/6232; G06K 9/6256; G06K 9/6265; G06K 9/6267
 See application file for complete search history.

(56) References Cited

U.S. PATENT DOCUMENTS

| | | | | |
|---|---|---|---|---|
| 2020/0272888 | A1* | 8/2020 | Wang | G06K 9/00342 |
| 2021/0150252 | A1* | 5/2021 | Sarlin | G06K 9/6215 |
| 2021/0236043 | A1* | 8/2021 | Islam | A61B 5/4866 |
| 2021/0237774 | A1* | 8/2021 | Tang | G06K 9/46 |
| 2021/0241522 | A1* | 8/2021 | Guler | G06T 7/75 |
| 2021/0248611 | A1* | 8/2021 | Matyska | G06Q 20/027 |

OTHER PUBLICATIONS

Yi et al., "Learning to Find Good Correspondences," 2018, found at http://openaccess.thecvf.com/content_cvpr_2018/papers/Yi_Learning_to_Find_CVPR_2018_paper.pdf.

Zhang et al., "Learning Two-View Correspondences and Geometry Using Order-Aware Network," 2019, found at http://openaccess.thecvf.com/content_ICCV_2019/papers/Zhang_Learning_Two-View_Correspondences_and_Geometry_Using_Order-Aware_Network_ICCV_2019_paper.pdf.

Pourian et al., "An End to End Framework to High Performance Geometry-Aware Multi-Scale Keypoint Detection and Matching in Fisheye Images," IEEE, 2019, abstract linked at https://ieeexplore.ieee.org/abstract/document/8803707.

Zeng et al., "3DMatch: Learning Local Geometric Descriptors from RGD-D Reconstructions," 2017, found at http://openaccess.thecvf.com/content_cvpr_2017/papers/Zeng_3DMatch_Learning_Local_CVPR_2017_paper.pdf.

Agarwal et al., "Bundle adjustment in the large", In European conference on computer vision, pp. 29-42. Springer, 2010.

Balntas, et al., "Hpatches: A bench-mark and evaluation of handcrafted and learned local descriptors", found at: arXiv:1704.05939v1 [cs.CV] Apr. 19, 2017.

Cadena et al., "Past, present, and future of simultaneous localization and mapping: Toward the robust-perception age", found at: arXiv:1606.05830v4 [cs.RO] Jan. 30, 2017.

Christiansen et al., "Unsuperpoint: End-to-end unsupervised interest point detector and descriptor", found at: arXiv:1907 04011v1 [cs.CV] Jul. 9, 2019.

DeTone, "Self-improving visual odometry" found at: arXiv:1812.03245v1 [cs.CV] Dec. 8, 2018.

DeTone et al., "Superpoint: Self-supervised interest point detection and description", found at: arXiv:1712.07629v4 [cs.CV] Apr. 19, 2018.

Guizilini et al., "Packnet-sfm: 3d packing for self-supervised monocular depth estimation", found at: arXiv:1905.02693v2 [cs.CV] Sep. 23, 2019.

Lin et al, "Microsoft coco: Common objects in context", found at: arXiv:1405.0312v2 [cs.CV] Jul. 5, 2014.

Lowe, "Distinctive image features from scale-invariant keypoints", International Journal of Computer Vision, Nov. 2004.

Lowe et al., "Object recognition from local scale-invariant features", In iccv, vol. 99, pp. 1150-1157, 1999.

Ono et al., LF-Net: Learning local features from images, found at: arXiv:1805.09662v2 [cs.CV] Nov. 22, 2018.

Pillai et al., "Superdepth: Self-supervised, super-resolved monocular depth estimation" found at: arXiv:1810.01849v1 [cs.CV] Oct. 3, 2018.

Rosten et al., "Machine learning for high-speed corner detection", In Proceedings of the European Conference on Computer Vision (ECCV), pp. 430-443, 2006.

Rosten et al., "Faster and better: A machine learning approach to corner detection", found at: arXiv:0810.2434v1 [cs.CV] Oct. 14, 2008.

Rublee et al., "Orb: An efficient alternative to sift or surf", In ICCV, vol. 11, p. 2. Citeseer, 2011.

Sarlin et al., "From coarse to fine: Robust hierarchical localization at large scale", found at: reacharXiv: 1812 03506V2 [cs.CV] Apr. 8, 2019.

Savinov et al., "Quad-networks: Unsupervised learning to rank for interest point detection", In The IEEE Conference on Computer Vision and Pattern Recognition (CVPR), Jul. 2017.

Shi et al., "Real-time single image and video super-resolution using an efficient sub-pixel convolutional neural network" found at: arXiv:1609.05158v2 [cs.CV] Sep. 23, 2016.

Yi et al., "LIFT: Learned Invariant Feature Transform", found at: arXiv:1603.09114v2 [cs.CV] Jul. 29, 2016.

Hadsell et al., "Dimensionality reduction by learning an invariant mapping", In Proc. CVPR, Jun. 2006.

Kingma et al. "Adam: A method for stochastic optimization", found at: arXiv:1412.6980v1 [cs.LG] Dec. 22, 2014.

Kirillov et al., "Panoptic feature pyramid networks", found at: arXiv:1901 02446v2 [cs.CV] Apr. 10, 2019.

Kolesnikov et al., "Revisiting self-supervised visual representation learning", found at: arXiv:1901.09005v1 [cs.CV] Jan. 25, 2019.

Lang et al., "Pointpillars: Fast encoders for object detection from point clouds", found at: arXiv:1812.05784v2 [cs.LG] May 7, 2019.

Li et al., "Learning to fuse things and stuff", found at: arXiv:1812.01192v1 [cs.CV] Dec. 4, 2018.

Paszke, et al., "Automatic differentiation in pytorch" 31st Conference on Neural Information Processing Systems (NIPS-W) 2017.

Sun et al., "Deep high-resolution representation learning for human pose estimation", found at: arXiv:1902.09212v1 [cs CV] Feb. 25, 2019.

Schroff et al., "Facenet: A unified embedding for face recognition and clustering", found at: arXiv:1503.03832v2 [cs.CV] Jun. 1, 2015.

Tian et al., "Fcos: Fully convolutional one-stage object detection", found at: arXiv:1904.01355v1 [cs.CV] Apr. 2, 2019.

Verdie et al., "Tilde: A temporally invariant learned detector", found at: arXiv:1411.4568v3 [cs.CV] Mar. 12, 2015.

Vondrick et al., "Tracking emerges by colorizing videos", found at: arXiv:1806.09594v2 [cs.CV] Jul. 27, 2018.

Nang et al., "Learning correspondence from the cycle-consistency of time", found at: arXiv:1903.07593v2 [cs.CV] Apr. 2, 2019.

Tang et al., ABSTRACT of "Geometric correspondence network for camera motion estimation", IEEE Robotics and Automation Letters, 3(2):1010-1017, 2018.

* cited by examiner

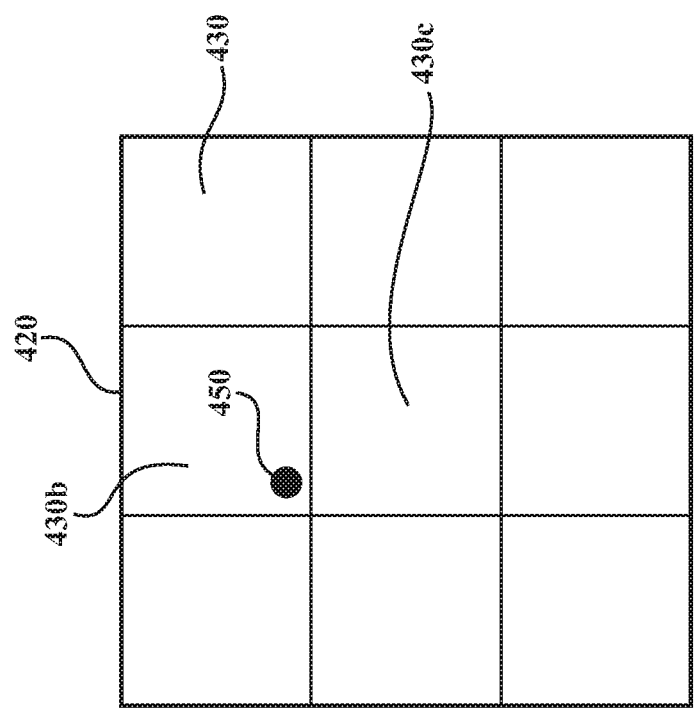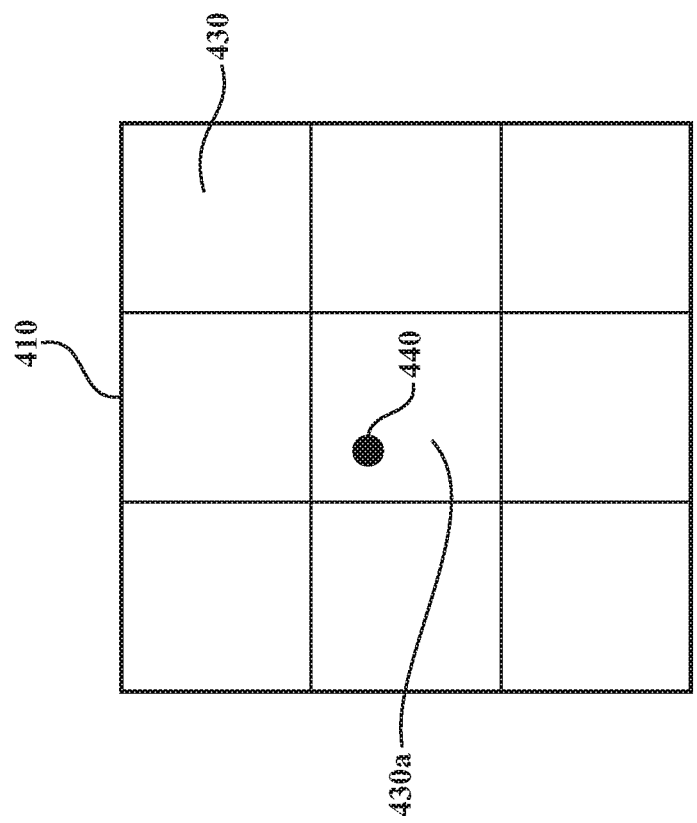
FIG. 4

SYSTEMS AND METHODS FOR TRAINING A NEURAL KEYPOINT DETECTION NETWORK

CROSS-REFERENCE TO RELATED APPLICATION

This application claims the benefit of U.S. Provisional Patent Application No. 62/904,916, "Neural Outlier Rejection for Self-Supervised Keypoint Learning," filed Sep. 24, 2019, which is incorporated by reference herein in its entirety.

TECHNICAL FIELD

The subject matter described herein generally relates to robotics and machine vision and, more particularly, to systems and methods for training a neural keypoint detection network.

BACKGROUND

Detecting interest points or "keypoints" in images and matching them between different views of the same scene is a fundamental capability of many robotic systems, including autonomous vehicles. Machine-learning-based solutions have yielded encouraging results, but despite some advances in this area, generating consistent and accurate training data for neural keypoint detection networks and robustly detecting and matching keypoints in demanding applications remain challenging tasks.

SUMMARY

An example of a system for training a neural keypoint detection network is presented herein. The system comprises one or more processors and a memory communicably coupled to the one or more processors. The memory stores an input preparation module including instructions that when executed by the one or more processors cause the one or more processors to extract a portion of an input image. The input preparation module also includes instructions that when executed by the one or more processors cause the one or more processors to apply a transformation to the portion of the input image to produce a transformed portion of the input image. The memory also stores a keypoint analysis module including instructions that when executed by the one or more processors cause the one or more processors to process the portion of the input image and the transformed portion of the input image using the neural keypoint detection network to identify one or more candidate keypoint pairs between the portion of the input image and the transformed portion of the input image. The memory also stores an outlier rejection module including instructions that when executed by the one or more processors cause the one or more processors to process the one or more candidate keypoint pairs using an inlier-outlier neural network, the inlier-outlier neural network producing an indirect supervisory signal to train the neural keypoint detection network to identify one or more candidate keypoint pairs between the portion of the input image and the transformed portion of the input image.

Another embodiment is a non-transitory computer-readable medium for training a neural keypoint detection network and storing instructions that when executed by one or more processors cause the one or more processors to extract a portion of an input image. The instructions also cause the one or more processors to apply a transformation to the portion of the input image to produce a transformed portion of the input image. The instructions also cause the one or more processors to process the portion of the input image and the transformed portion of the input image using the neural keypoint detection network to identify one or more candidate keypoint pairs between the portion of the input image and the transformed portion of the input image. The instructions also cause the one or more processors to process the one or more candidate keypoint pairs using an inlier-outlier neural network, the inlier-outlier neural network producing an indirect supervisory signal to train the neural keypoint detection network to identify one or more candidate keypoint pairs between the portion of the input image and the transformed portion of the input image.

In another embodiment, a method of training a neural keypoint detection network is disclosed. The method comprises extracting a portion of an input image. The method also includes applying a transformation to the portion of the input image to produce a transformed portion of the input image. The method also includes processing the portion of the input image and the transformed portion of the input image using the neural keypoint detection network to identify one or more candidate keypoint pairs between the portion of the input image and the transformed portion of the input image. The method also includes processing the one or more candidate keypoint pairs using an inlier-outlier neural network, the inlier-outlier neural network producing an indirect supervisory signal to train the neural keypoint detection network to identify one or more candidate keypoint pairs between the portion of the input image and the transformed portion of the input image.

BRIEF DESCRIPTION OF THE DRAWINGS

So that the manner in which the above-recited features of the present disclosure can be understood in detail, a more particular description of the disclosure, briefly summarized above, may be had by reference to the implementations, some of which are illustrated in the appended drawings. It is to be noted, however, that the appended drawings illustrate only possible implementations of this disclosure and are therefore not to be considered limiting of its scope. The disclosure may admit to other implementations.

FIG. 4 illustrates identifying keypoints in first and second images of a scene, in accordance with an illustrative embodiment of the invention.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

Various embodiments described herein improve on conventional keypoint detection and matching systems in some important ways. For example, most machine-learning-based keypoint detection and matching systems require some degree of manual supervision during the training phase and rely on labels that are often expensive to acquire. Compounding this problem is that supervising keypoint detection is unnatural for a human annotator because such a person cannot readily identify salient regions in images as well as key signatures or descriptors that would permit their re-identification. Consequently, the embodiments described herein employ an improved self-supervised methodology for jointly training a keypoint detector and its associated descriptor.

Various embodiments include the use of a neural inlier-outlier network (hereinafter "inlier-outlier network" or "IO-Net") to produce an indirect supervisory signal or proxy task for the self-supervised training of keypoint detection, description, and matching. This permits a neural keypoint detection network to learn distinguishable features for two-view keypoint matching via the flow of gradients from consistently matched keypoint pairs.

Some conventional keypoint detection systems divide images into cells, but the predicted keypoints within a given image do not cross cell boundaries. In various embodiments described herein, during the training phase and in a later on-line operational phase, the keypoint detection system can effectively aggregate keypoints across cell boundaries, which significantly improves performance. Moreover, in some embodiments, the input images are encoded (compressed) before being processed by the neural keypoint detection network, and an upsampling operation is used prior to regression of the descriptors associated with the keypoints to promote the capturing of finer details in a higher-resolution grid.

The techniques described herein can be applied to a variety of robotics applications involving keypoint detection, including autonomous-vehicle localization and mapping and machine vision for humanoid robots.

Figure 1:
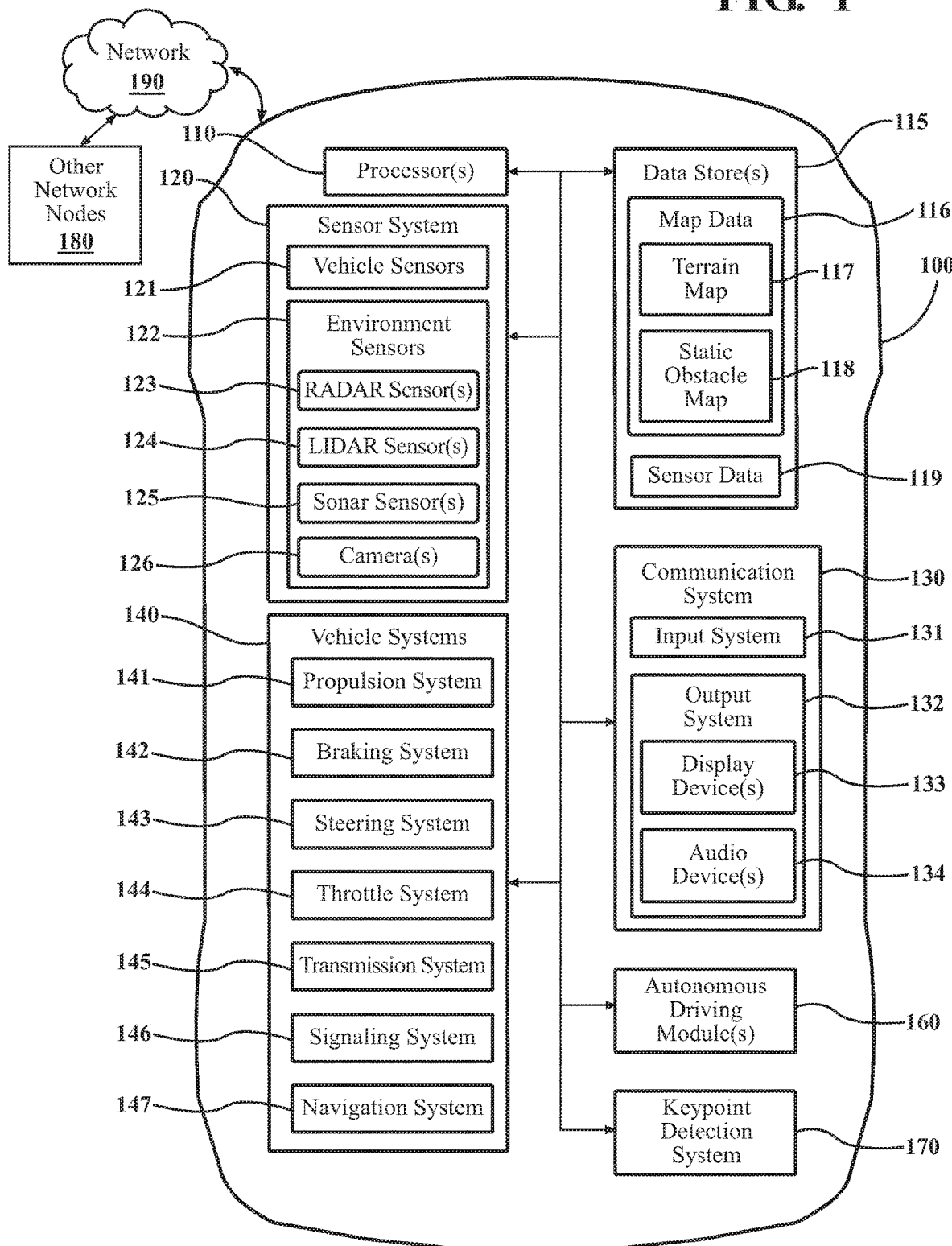
FIG. 1 illustrates one embodiment of a vehicle within which systems and methods disclosed herein may be implemented.

Referring to FIG. 1, an example of a vehicle 100, in which systems and methods disclosed herein can be implemented, is illustrated. A vehicle 100 is only one example of an environment in which systems and methods disclosed herein can be implemented. As mentioned above, the techniques described herein have wide application to other areas of robotics, including humanoid robots. The vehicle 100 can include a keypoint detection system 170 or components and/or modules thereof. As used herein, a "vehicle" is any form of motorized transport. In one or more implementations, the vehicle 100 can be an automobile. In some implementations, the vehicle 100 may be any other form of motorized transport. In various embodiments, vehicle 100 is capable of operating in a manual, semi-autonomous, parallel-autonomy, or fully autonomous mode. The vehicle 100 can include the keypoint detection system 170 or capabilities to support or interact with the keypoint detection system 170 and thus benefits from the functionality discussed herein. While arrangements will be described herein with respect to automobiles, it will be understood that implementations are not limited to automobiles. Instead, implementations of the principles discussed herein can be applied to any kind of vehicle and to devices and environments (e.g., robots) other than vehicles, as discussed above. Instances of vehicle 100, as used herein, are equally applicable to any device capable of incorporating the systems or methods described herein.

The vehicle 100 also includes various elements. It will be understood that, in various implementations, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1, including keypoint detection system 170. While the various elements are shown as being located within the vehicle 100 in FIG. 1, it will be understood that one or more of these elements can be located external to the vehicle 100. Further, the elements shown may be physically separated by large distances. As shown in FIG. 1, vehicle 100 may communicate with one or more other network nodes 180 (cloud servers, infrastructure systems, user mobile devices, etc.) via network 190.

Some of the possible elements of the vehicle 100 are shown in FIG. 1 and will be described in connection with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those skilled in the art, however, will understand that the embodiments described herein may be practiced using various combinations of these elements.

Sensor system 120 can include one or more vehicle sensors 121. Vehicle sensors 121 can include one or more positioning systems such as a dead-reckoning system or a global navigation satellite system (GNSS) such as a global positioning system (GPS). Vehicle sensors 121 can also include Controller-Area-Network (CAN) sensors that output, for example, speed and steering-angle data pertaining to vehicle 100. Sensor system 120 can also include one or more environment sensors 122. Environment sensors 122 can include radar sensor(s) 123, Light Detection and Ranging (LIDAR) sensor(s) 124, sonar sensor(s) 125, and camera(s) 126. In the embodiments described herein, image data from camera(s) 126 are of particular relevance because keypoint detection system 170 can identify and match keypoints between different views (images) of a scene. In some embodiments, the input images depicting a scene are in red-green-blue (RGB) format. In other embodiments, a different image format may be used.

Figure 2:
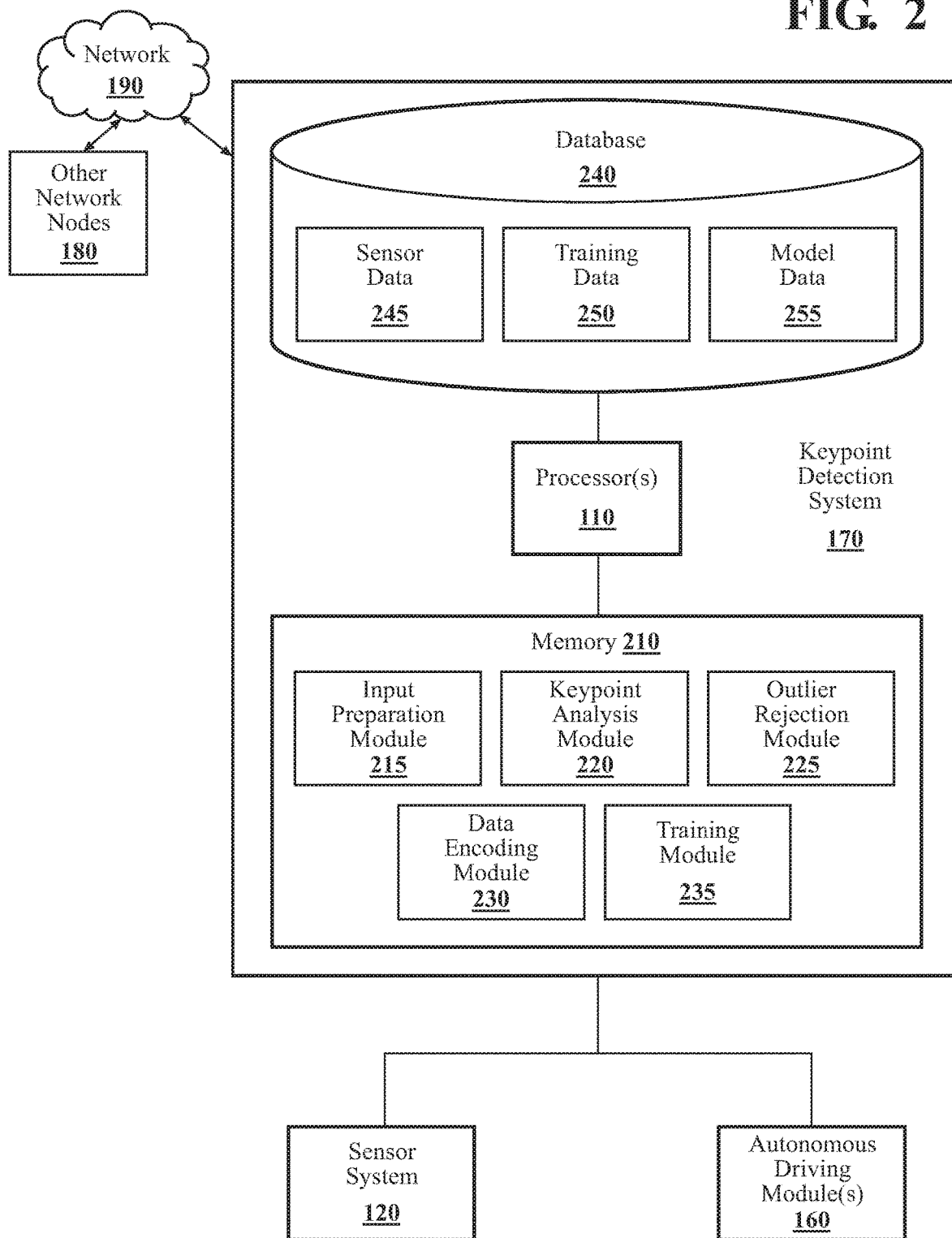
FIG. 2 illustrates one embodiment of a keypoint detection system for a vehicle.

Referring to FIG. 2, one embodiment of the keypoint detection system 170 of FIG. 1 is further illustrated. In this embodiment, keypoint detection system 170 is shown as including one or more processors 110 from the vehicle 100 of FIG. 1. In general, the one or more processors 110 may be a part of keypoint detection system 170, keypoint detection system 170 may include one or more separate processors from the one or more processors 110 of the vehicle 100, or keypoint detection system 170 may access the one or more processors 110 through a data bus or another communication path, depending on the embodiment.

In one embodiment, memory 210 stores an input preparation module 215, a keypoint analysis module 220, an outlier rejection module 225, a data encoding module 230, and a training module 235. The memory 210 is a random-access memory (RAM), read-only memory (ROM), a hard-disk drive, a flash memory, or other suitable memory for storing the modules 215, 220, 225, 230, and 235. The modules 215, 220, 225, 230, and 235 are, for example, computer-readable instructions that when executed by the one or more processors 110, cause the one or more processors 110 to perform the various functions disclosed herein.

As shown in FIG. 2, keypoint detection system 170 can communicate with one or more other network nodes 180 (e.g., cloud servers, infrastructure systems, user mobile devices, etc.) via network 190. In communicating with cloud servers, infrastructure systems (traffic signals, roadside units, etc.), or user mobile devices, keypoint detection system 170 can employ a technology such as cellular data (LTE, 5G, etc.). As shown in FIG. 2, keypoint detection system 170 can also interface and communicate with sensor system 120 and autonomous driving module(s) 160, in some embodiments.

In some embodiments, keypoint detection system 170 stores sensor data 245 output by sensor system 120 in a database 240. As discussed above, such sensor data 245 can include images data from camera(s) 126, radar data from radar sensor(s) 123, and LIDAR point-cloud data from LIDAR sensor(s) 124. In some embodiments in which a training phase of keypoint detection system 170 is carried out using an in-vehicle implementation, keypoint detection system 170 stores training data 250 (samples images and other data used in training a neural keypoint detection network) in database 240. In other embodiments, keypoint detection system 170 does not include input preparation module 215, training module 235, or outlier rejection module 225 and does not store training data 250 in database 240 because the training phase is carried out separately from keypoint detection system 170 (e.g., at a different location such as a robot manufacturer's research and development facility). In those embodiments, the parameters and data of a trained neural keypoint detection network can be downloaded to a keypoint detection system 170 in a vehicle 100 or other robot from, e.g., a cloud server (see other network nodes 180 in FIGS. 1 and 2). In some embodiments, keypoint detection system 170 can also store, in database 240, model data 255 (e.g., intermediate calculations, candidate keypoints or keypoint pairs, figures of merit, etc.) associated with its image analysis and identification of keypoints.

The remainder of this description is organized as follows. First, an overview is provided of the functions performed by the various modules included in keypoint detection system 170 beginning with the aspects pertaining to the training phase of a neural keypoint detection network and concluding with the aspects pertaining to an on-line operational phase. Second, certain embodiments of keypoint detection system 170 are described in greater detail, including the underlying mathematical concepts and techniques. Third, the methods associated with some embodiments are discussed via the method flowcharts in FIGS. 5 and 6. Finally, a complete description of FIG. 1 is provided.

Training module 235, which pertains to the training phase of keypoint detection system 170, generally includes instructions that when executed by the one or more processors 110 cause the one or more processors 110 to train a neural keypoint detection network in accordance with a self-supervised training process in which the neural keypoint detection network processes sample image segments (portions of sample input images used for training) and corresponding transformed sample image segments under the constraint of three direct supervisory signals that include a keypoint-location loss function, a keypoint-descriptor loss function, and a keypoint-quality-score loss function. In essence, the training process teaches the neural keypoint detection network how to identify candidate keypoint pairs between two different views of a scene by applying the above-mentioned constraints to the detection of keypoints in an original sample image segment and in the transformed version of the sample image segment. The training phase of the neural keypoint detection network that forms part of keypoint detection system 170 is described in greater detail below.

Input preparation module 215, which also pertains to the training phase, generally includes instructions that when executed by the one or more processors 110 cause the one or more processors 110 to extract a portion of an input image (one of the sample image segments mentioned in the preceding paragraph) and to apply a transformation to the portion of the input image to produce a transformed portion of the input image. The input image can, e.g., be retrieved from training data 250. In some embodiments, the portion of the input image that input preparation module 215 extracts is randomly selected. Thus, such an extracted portion of the input image may be termed a "random crop" of the image. In some embodiments, the transformation includes rotation, color change, or both. In some embodiments, input preparation module 215 chooses the transformation randomly, but the random transformation that is ultimately applied is known (noted or retained by the system) so as to provide a ground-truth reference for the relationship between the original portion of the input image and its transformed counterpart.

Keypoint analysis module 220 pertains to both the training phase and the on-line operational phase. In various embodiments, keypoint analysis module 220 includes a neural keypoint detection network that is discussed in greater detail below. Regarding the training phase, keypoint analysis module 220 generally includes instructions that when executed by the one or more processors 110 cause the one or more processors 110 to process an extracted portion of an input image and a transformed version of the extracted portion of the input image, as explained above, using the neural keypoint detection network to identify one or more candidate keypoint pairs between the original portion of the input image and the transformed version of the portion of the input image. An overview of keypoint analysis module 220 as it pertains to the on-line operational phase is provided below following an overview of outlier rejection module 225 and data encoding module 230. However, some aspects of keypoint analysis module 220 that are presented below in the context of the on-line operational phase are also applicable to the training phase.

Outlier rejection module 225, which pertains to the training phase, generally includes instructions that when executed by the one or more processors 110 cause the one or more processors 110 to process the one or more candidate keypoint pairs identified by keypoint analysis module 220 using an inlier-outlier neural network. In some embodiments, the inlier-outlier neural network produces an indirect supervisory signal that trains (e.g., during one or more subsequent passes through a training loop) the neural keypoint detection network associated with keypoint analysis module 220 to identify one or more candidate keypoint pairs between the original extracted portion of the input image and the transformed version of the portion of the input image. During the training phase, the indirect supervisory signal operates in conjunction with the three direct supervisory signals for keypoint location, descriptors, and quality scores mentioned above. The loss functions associated with the locations, descriptors, quality scores, and inlier-outlier network are discussed in greater detail below.

In some embodiments, outlier rejection module 225 outputs a probability that a given candidate keypoint pair among the one or more candidate keypoint pairs belongs to an inlier set (i.e., a set of keypoint pairs that are deemed to match between the original extracted portion of the input image and the transformed version). In some embodiments, outlier rejection module 225 classifies candidate keypoint pairs as belonging to the inlier set or to an outlier set, and the indirect supervisory signal mentioned above includes the propagation of gradients from the classification of a given candidate keypoint pair as belonging to the inlier set or outlier set. In some embodiments, the inlier-outlier neural network includes a one-dimensional convolutional neural network. Additional details about one illustrative implementation of the inlier-outlier network are provided below.

Data encoding module 230 pertains primarily to the on-line operational phase of keypoint detection system 170, although some aspects such as encoding (compressing) input image data into a reduced-resolution embedding space can also apply to the training phase, depending on the embodiment. Data encoding module 230 generally includes instructions that when executed by the one or more processors 110 cause the one or more processors 110 to acquire two different images (a first image and a second image) of the same scene. The two acquired images can, for example, be among the sensor data 245 obtained from sensor system 120 (e.g., camera(s) 126) of a vehicle 100. The two different images can be taken from different vantage points by different cameras or by the same camera from the same vantage point at two different points in time (e.g., one in the daytime and one at twilight). In general, the two images depict the same scene, but the two images differ in some respect (vantage point, lighting, etc.), representing different views of the scene in question.

Data encoding module 230 also includes instructions to subdivide the first image into a first plurality of cells and to subdivide the second image into a second plurality of cells. In one embodiment, each cell is eight pixels by eight pixels (8×8) in size. In other embodiments, data encoding module 230 can subdivide the two different images of the scene into cells having different dimensions other than 8×8 pixels.

In some embodiments, data encoding module 230 includes instructions to encode the first and second images of the scene into a reduced-resolution embedding space to produce a first encoded image of the scene and a second encoded image of the scene, respectively. As discussed further below, in some embodiments, data encoding module 230 compresses the input images by a factor of 64 (a factor of eight in each dimension, width and height) so that each 8×8-pixel cell in the original first and second images is represented by a single pixel in the first and second encoded images.

Keypoint analysis module 220, discussed above in the context of the training phase, generally includes instructions that when executed by the one or more processors 110 cause the one or more processors 110 to process the first plurality of cells and the second plurality of cells using a neural keypoint detection network to identify, for a particular cell in the first plurality of cells, a first keypoint within the first plurality of cells and to identify, for a particular cell in the second plurality of cells, a second keypoint in the second plurality of cells. In one embodiment, the first keypoint, the second keypoint, or both the first and second keypoints lie in a cell other than the particular cell in the first or second plurality of cells for which the applicable keypoint was identified. This is explained in further detail in connection with FIG. 4 below.

In some embodiments, keypoint analysis module 220 identifies one keypoint in each cell in the first plurality of cells. Thus, the total number of keypoints identified for a given input image depends on the resolution of the input image. As explained below in connection with FIG. 4, the keypoint identified for a given cell does not have to reside within that cell. The identified keypoint for a cell can instead lie in a different cell. This ability for keypoints to cross cell boundaries is an improvement over conventional keypoint detection systems.

Keypoint analysis module 220 also generally includes instructions that when executed by the one or more processors 110 cause the one or more processors 110 to classify the first keypoint and the second keypoint as a matching keypoint pair based, at least in part, on a comparison between a first descriptor associated with the first keypoint and a second descriptor associated with the second keypoint. As explained in greater detail below, a keypoint descriptor is a high-dimensional vector (e.g., 64, 128, or 256 dimensions) that characterize the portion of an image in the vicinity of the associated keypoint. For example, the descriptor might be a patch of image surrounding the keypoint or an encoded version of the surrounding image data.

As mentioned above, keypoint analysis module 220 can classify the first keypoint and the second keypoint as a matching keypoint pair between the two views of the scene based, at least in part, on a comparison between the respective associated descriptors. In some embodiments, the comparison includes computing a Euclidian distance between the first descriptor and the second descriptor. In some embodiments, keypoint analysis module 220 includes instructions to upsample the first encoded image of the scene and the second encoded image of the scene prior to regressing the first descriptor and the second descriptor, where the input images of the scene have been previously encoded (compressed) by data encoding module 230, as discussed above. This upsampling operation promotes the capture of finer details in a higher resolution grid.

In some embodiments, keypoint analysis module 220 identifies a given keypoint with respect to the center of the cell for which that keypoint was identified. For example, in an embodiment in which the cells are 8×8 pixels, the center pixel might have the relative cell-level coordinates (4,4) (e.g., with the origin at the bottom left corner of the cell in question). This formulation has advantages in training the neural keypoint detection network.

Particular embodiments of the invention (hereinafter "these embodiments") will next be described in greater detail, including the underlying mathematical concepts and techniques. Both the training phase and the on-line operational phase are addressed. In these embodiments, the objective is to regress a function that takes an image as input and outputs keypoints (e.g., their locations in the image space as sets of spatial coordinates), descriptors, and quality scores (hereinafter, simply "scores"). These operations are performed on two different images of the same scene, and the neural keypoint detection network associated with keypoint analysis module 220 is trained to match keypoint pairs between the two views based, at least in part, on a comparison of the respective descriptors associated with the keypoints in a candidate keypoint pair.

One can define K: $I \rightarrow \{p, f, s\}$, with input image $I \in \mathbb{R}^{3 \times H \times W}$ and output keypoints $p = \{[u, v]\} \in \mathbb{R}^{2 \times N}$, E descriptors $f \in \mathbb{R}^{256 \times N}$, and scores $s \in \mathbb{R}^N$, where N represents the total number of keypoints extracted, which varies according to the resolution of the input image, as defined further below. In the discussion that follows, the symbol "p" refers to the set of keypoints extracted from an image, whereas "*p*" (the italicized form) refers to a single keypoint.

The learning framework (neural keypoint detection network) is, in these embodiments, trained in a self-supervised manner by receiving as input a source image $I_s$ such that $K(I_s)=\{p_s, f_s, s_s\}$ and a target image $I_t$ such that $K(I_t)=\{p_t, f_t, s_t\}$. The two images $I_s$ and $I_t$ are related through a known homography transformation H which warps a pixel from the source image and maps it into the target image. As discussed above, the source image is, in some embodiments, a randomly extracted portion of a larger input image (e.g., from training data 250), and the target image is a randomly transformed version of the extracted portion of the input image. Regarding the transformation, one can define $p_t^* = \{[u_i^*, v_i^*]\} = H(p_s)$, where $i \in I$, i.e., the corresponding locations of source keypoints $p_s$ after being warped into the target image.

In these embodiments, a second function C is defined that takes as inputs candidate keypoint pairs along with associated weights according to a distance metric and outputs the likelihood that each candidate keypoint pair belongs to an inlier set of matched keypoint pairs. Formally, one can define $C: \{p_s, p_t^*, d(f_s, f_t^*)\} \in \mathbb{R}^{5 \times N} \to \mathbb{R}^N$ as a mapping that computes the probability that a candidate keypoint pair belongs to an inlier set. In these embodiments, the function C is used only at training time to choose an optimal set of consistent inliers among candidate keypoint pairs and to encourage the gradient flow through consistent keypoint pairs.

Figure 3:
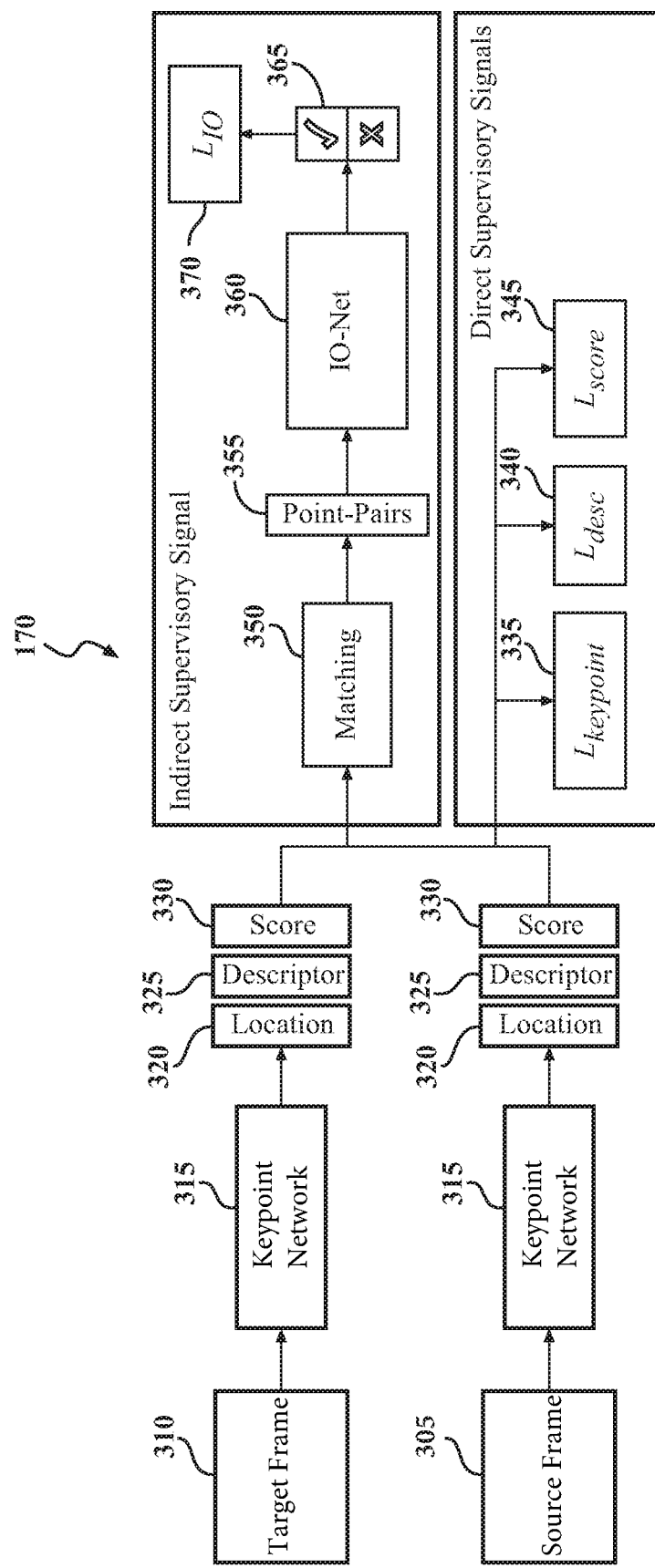
FIG. 3 is a functional block diagram of a keypoint detection system configured for a training phase, in accordance with an illustrative embodiment of the invention.

FIG. 3 is a functional block diagram of a keypoint detection system 170 configured for a training phase, in accordance with an illustrative embodiment of the invention. As shown in FIG. 3, a source frame (portion of an input image) 305 and a target frame (transformed version of the source frame) 310 are both input to a neural keypoint detection network 315. Though FIG. 3 implies that this is done simultaneously, in practice the source frame 305 and the target frame 310 can be processed through the network sequentially, in some embodiments. The neural keypoint detection network 315 is optimized in an end-to-end differentiable manner by imposing an explicit loss function on each of the three network outputs—location 320, descriptor 325, and score 330, respectively: $L_{keypoint}$ (335), $L_{desc}$ (340), and $L_{score}$ (345). These constitute direct supervisory signals for the training of the neural keypoint detection network 315.

Once both source frame 305 and target frame 310 have been processed by neural keypoint detection network 315, a keypoint matching operation 350 identifies one or more candidate keypoint pairs 355 between the two input frames. Inlier-outlier network (IO-Net) 360 outputs a probability that the respective candidate keypoint pairs are in an inlier set of matched keypoint pairs. An inlier/outlier classification operation 365 decides whether a given candidate keypoint pair is in the inlier set (e.g., based on the probability just mentioned). An inlier-outlier loss function 370 acts as an indirect supervisory signal for the training of the neural keypoint detection network 315 by propagating gradients from the classification of matching keypoint pairs.

The structures of the neural keypoint detection network 315 and the inlier-outlier network 360, in these embodiments, are summarized in Tables 1 and 2, respectively. In other embodiments, these structures may differ. In general, any structure compatible with the dimensionality requirements (e.g., image to keypoints, etc.) can be used.

TABLE 1

| Layer Description | K | Output Tensor Dim. |
|---|---|---|
| #0 Input RGB Image | | 3 × H × W |
| Encoder | | |
| #1 Conv2d + BatchNorm + LReLU | 3 | 32 × H × W |
| #2 Conv2d + BatchNorm + LReLU + Dropout | 3 | 32 × H × W |
| #3 Max. Pooling (×½) | 3 | 32 × H/2 × W/2 |
| #4 Conv2d + BatchNorm + LReLU | 3 | 64 × H/2 × W/2 |
| #5 Conv2d + BatchNorm + LReLU + Dropout | 3 | 64 × H/2 × W/2 |
| #6 Max. Pooling (×½) | 3 | 64 × H/4 × W/4 |
| #7 Conv2d + BatchNorm + LReLU | 3 | 128 × H/4 × W/4 |
| #8 Conv2d + BatchNorm + LReLU + Dropout | 3 | 128 × H/4 × W/4 |
| #9 Max. Pooling (×½) | 3 | 128 × H/8 × W/8 |
| #10 Conv2d + BatchNorm + LReLU | 3 | 256 × H/8 × W/8 |
| #11 Conv2d + BatchNorm + LReLU + Dropout | 3 | 256 × H/8 × W/8 |
| Score Head | | |
| #12 Conv2d + BatchNorm + Dropout (#11) | 3 | 256 × H/8 × W/8 |
| #13 Conv2d + Sigmoid | 3 | 1 × H/8 × W/8 |
| Location Head | | |
| #14 Conv2d + BatchNorm + Dropout (#11) | 3 | 256 × H/8 × W/8 |
| #15 Conv2d + Tan. Hyperbolic | 3 | 2 × H/8 × W/8 |
| Descriptor Head | | |
| #16 Conv2d + BatchNorm + Dropout (#11) | 3 | 256 × H/8 × W/8 |
| #17 Conv2d + BatchNorm | 3 | 512 × H/8 × W/8 |
| #18 Pixel Shuffle (×2) | 3 | 128 × H/8 × W/8 |
| #19 Conv2d + BatchNorm (#8 ⊗ #18) | 3 | 256 × H/4 × W/4 |
| #20 Conv2d | 3 | 256 × H/4 × W/4 |

TABLE 2

| Layer Description | K | Output Tensor Dim. |
|---|---|---|
| #0 Input Keypoints | | 5 × N |
| #1 Conv1d + ReLU | 1 | 128 × N |
| #2 ResidualBlock | — | 128 × N |
| #3 ResidualBlock (#2 ⊕ #1) | — | 128 × N |
| #4 ResidualBlock (#3 ⊕ #2) | — | 128 × N |
| #5 ResidualBlock (#4 ⊕ #3) | — | 128 × N |
| #6 Conv1d | 1 | 1 × N |
| ResidualBlock | | |
| Conv1d + InstNorm + BatchNorm + ReLU | 1 | 128 × N |
| Conv1d + InstNorm + BatchNorm + ReLU | 1 | 128 × N |

In these embodiments, one can define the model K parameterized by $\theta_K$ as an encoder-decoder-style network. The encoder includes four VGG-style ("VGG" stands for "Visual Geometry Group") blocks stacked to reduce the resolution of the input image H×W to $H_C \times W_C = H/8 \times W/8$. This supports an efficient prediction for keypoint location and descriptors. In this low-resolution embedding space, each pixel corresponds to an 8×8 cell in the original image. The decoder includes three separate heads for the locations, descriptors, and scores, respectively. Thus, for an image of input size H×W, the total number of keypoints regressed is (H×W)/64, each with a corresponding score and descriptor. For every convolutional layer except the final one, batch normalization is applied with leakyReLU (leaky Rectified Linear Units) activation. The structure of the neural keypoint detection network 315 is specified in Table 1 above. As indicated in Table 2 above, the IO-Net is a one-dimensional convolution neural network (CNN), parameterized by $\theta_{IO}$.

In these embodiments, the location head of the neural keypoint detection network 315 outputs a location 320 relative to the 8×8 grid in which it operates for each pixel in the encoder embedding: $[u'_i, v'_i]$. The corresponding input image resolution coordinates $[u_i, v_i]$ are computed taking into account the grid's position in the encoder embedding. The corresponding keypoint location $[u_i^*, v_i^*]$ in the target frame after warping via the known homography H is computed. For each warped keypoint, the closest corresponding keypoint in the target frame is associated based on Euclidean distance. In some embodiments, keypoint pairs for which the distance exceeds a threshold $\epsilon_{uv}$ are discarded. The associated keypoints in the target frame are denoted by $\hat{p}_t = \{[\hat{u}_t, \hat{v}_t]\}$. The keypoint locations can be optimized using the following self-supervised loss formulation, which enforces keypoint location consistency across different views of the same scene:

$$L_{loc} = \Sigma_i \|p_t^* - \hat{p}_t\|_2.$$

To permit the aggregation of keypoints across cell boundaries, as discussed above, the relative cell coordinates $[u'_s, v'_s]$ are mapped to the input image coordinates via the following function:

$$[v_i, u_i] = [row_i^{center}, col_i^{center}] + [v'_i, u'_i]\frac{\sigma_1(\sigma_2 - 1)}{2},$$

where $v'_i, u'_i \in (-1,1)$, $\sigma_2 = 8$ (the cell size), $\sigma_1$ is a ratio relative to the cell size, and $row_i^{center}, col_i^{center}$ are the center coordinates of each cell. By setting $\sigma_1$ to a value greater than 1, the network is permitted to predict keypoint locations across cell boundaries. Also, the above formulation reckons keypoint locations with respect to the center of the cell for which the keypoint is predicted/identified and permits a predicted keypoint to drift across cell boundaries, as explained below in connection with the discussion of FIG. 4. The specific mapping function shown above is merely one example of a mapping function that permits the keypoint identified for a particular cell to be located in a different cell—across cell boundaries.

FIG. 4 illustrates identifying keypoints in first and second images of a scene, in accordance with an illustrative embodiment of the invention. In FIG. 4, first image 410 and second image 420 are two different images of the same scene. Each of the two images is divided into a plurality of cells 430. In this particular example, neural keypoint detection network 315 has identified first keypoint 440 as a keypoint within cell 430a of the first image 410. Neural keypoint detection network 315 has also identified second keypoint 450 within cell 430b as a keypoint for cell 430c of the second image 420. Note that cell 430b is different from cell 430c, the cell for which neural keypoint detection network 315 identified keypoint 450. This illustrates the crossing of cell boundaries in identifying keypoints discussed above. This technique can apply to both the training phase and the on-line operational phase of keypoint detection system 170.

In these embodiments, a fast upsampling operation is included prior to regression of the descriptors, which promotes the capture of finer details in a higher resolution grid. Metric learning is also employed in training the descriptors, specifically a per-pixel triplet loss with nested hardest sample mining. Each keypoint $p_i \in p_s$ in the source image has an associated descriptor $f_i$, an anchor descriptor obtained by sampling the appropriate location in the dense descriptor map $f_s$. The associated descriptor $f_{i,+}^*$ in the target frame, a positive descriptor, is obtained by sampling the appropriate location in the target descriptor map $f_t$ based on the warped keypoint position $p_i^*$. The nested triplet loss can be defined as follows:

$$L_{desc} = \Sigma_i \max(0, \|f_i f_{i,+}^*\|_2 - \|f_i f_{i,-}^*\|_2 + m),$$

which minimizes the distance between the anchor and positive descriptors and maximizes the distance between the anchor and a negative $f_{i,-}^*$ sample. In these embodiments, the negative sample is the closest sample in the descriptor space that is not a positive sample. Any sample other than the true match can be used as the negative pair for the anchor, but the hardest negative sample will contribute the most to the loss function, and thus to the gradient, thereby accelerating the metric learning. Here, the parameter m denotes the distance margin enforcing how far dissimilar descriptors should be pushed away in the descriptor space.

During the on-line operational phase, the score 330 output by neural keypoint detection network 315 indicates the most reliable keypoints, from which a subset is selected. Thus, the objective of the loss function $L_{score}$ is two-fold: (1) ensuring that keypoint pairs have consistent scores and (2) enabling the network to learn that good keypoints are the ones with low keypoint distance. This objective is achieved by minimizing the squared distance between scores for each keypoint pair and minimizing or maximizing the average score of a keypoint pair, if the distance between the paired keypoints is greater or less than the average distance, respectively:

$$L_{score} = \sum_i \left[ \frac{(s_i + \hat{s}_i)}{2} \cdot (d(p_i, \hat{p}_i) - \bar{d}) + (s_i - \hat{s}_i)^2 \right],$$

where $s_i$ and $\hat{s}_i$ are, respectively, the scores of the source and target frames, $\bar{d}$ is the average re-projection error of associated points in the current frame, and $$\bar{d} = \sum_i^L \frac{d(p_i, \hat{p}_i)}{L},$$

with d being the keypoint distance in 2D Euclidean space and L being the total number of keypoint pairs.

In these embodiments, keypoint (location) and descriptor learning is tightly coupled with outlier rejection. Specifically, the latter is used as a proxy task to supervise the former. This is accomplished by associating keypoints from the source and target images based on descriptor distance: $\{p_s, p_t^*, x(f_s, f_t^*)\}$. In some embodiments, only keypoints with the lowest K predicted scores are used for training. Similar to the hardest sample mining, this approach accelerates the convergence rate and encourages the generation of a richer supervisory signal from the outlier-rejection loss function. To disambiguate the earlier association of keypoint pairs based on re-projected distance, one can define a distance metric x and specify that reference is made to Euclidean distance in descriptor space. The resulting candidate keypoint pairs, along with the computed distance between the descriptors of each candidate keypoint pair, are passed through the inlier-outlier network 360 (IO-Net), which outputs the probability that each candidate keypoint pair is an inlier or an outlier. Formally, the loss function can be defined as follows:

$$L_{IO}=\Sigma_i \tfrac{1}{2}(r_i-\text{sign}(\|p_i^*-\hat{p}_i\|_2-\epsilon_{uv})^2),$$

where r is the output of the inlier-outlier network 360 and $\epsilon_{uv}$ is the same Euclidean-distance threshold discussed above. Unlike a normal classifier, in these embodiments, outlier rejection module 225 also back-propagates the gradients to the input sample $\{p_s, p_t^*, x(f_s, f_t^*)\}$, which provides for optimization of both the location and the descriptor for matched keypoint pairs in an end-to-end differentiable manner.

The outlier-rejection task is related to the well-known Random Sample Consensus (RANSAC) algorithm in terms of the final objective. However, in these embodiments, since the ground-truth homography transform H is known, the random sampling and consensus aspects are not required. Intuitively, this can be seen as a special case in which only one hypothesis is sampled, i.e., the ground truth. Therefore, the task is simplified to directly classifying the outliers among the input candidate keypoint pairs. Further, a second difference with respect to existing neural RANSAC methods arises from the way the inlier-outlier network 360 is used. Specifically, in these embodiments, the inlier-outlier network 360 is used to explicitly generate an additional proxy supervisory signal for the input candidate keypoint pairs, as opposed to rejecting outliers. The final training objective may be defined as follows:

$$\mathcal{L}=\alpha L_{loc}+\beta L_{desc}+\lambda L_{score}+L_{IO},$$

where $[\alpha, \beta, \lambda]$ are weights that balance the different losses defined above. This description next shifts to a discussion of the methods associated with some embodiments.

Figure 5:
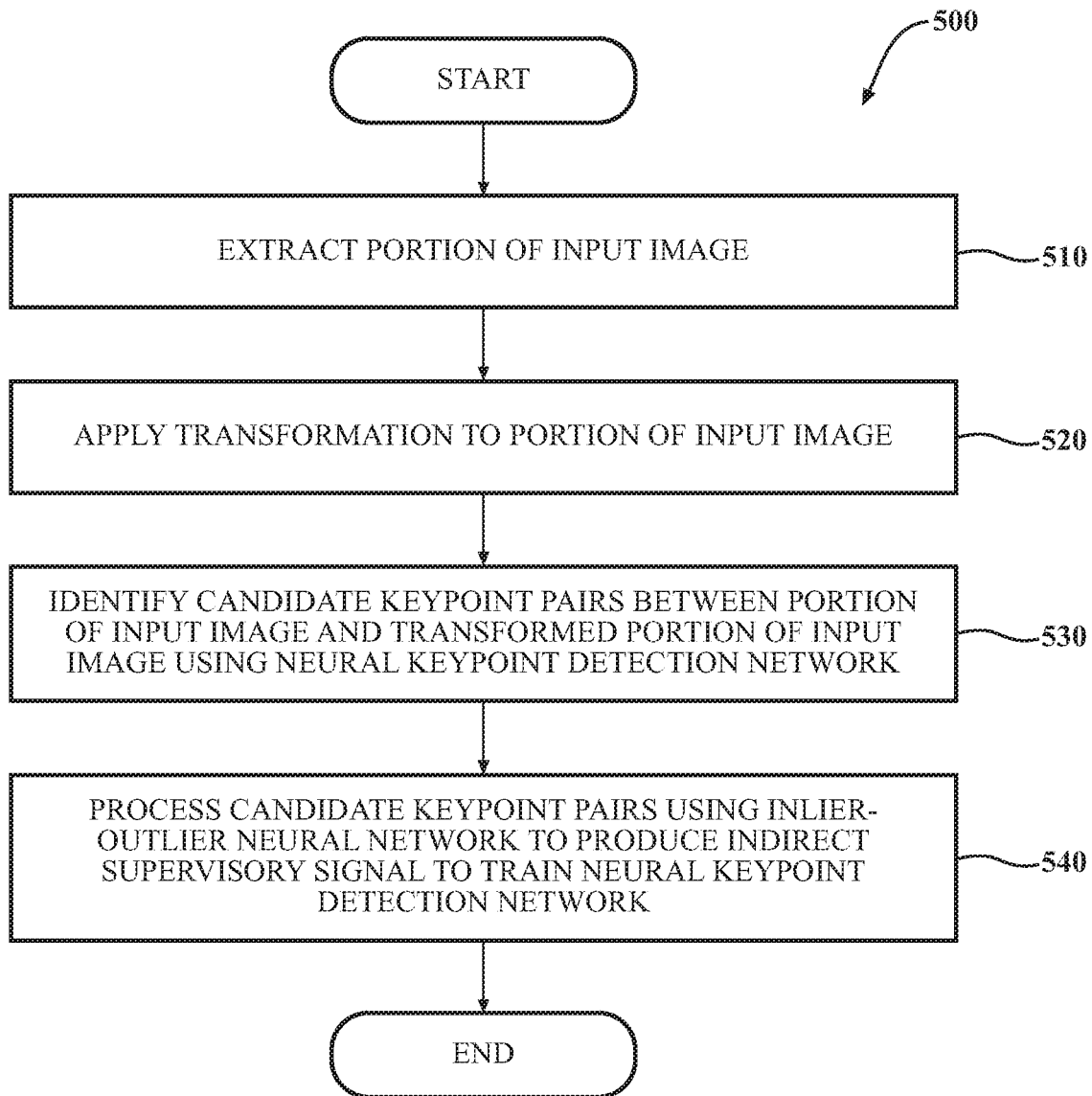
FIG. 5 is a flowchart of a method of training a neural keypoint detection network, in accordance with an illustrative embodiment of the invention.

FIG. 5 is a flowchart of a method 500 of training a neural keypoint detection network, in accordance with an illustrative embodiment of the invention. Method 500 will be discussed from the perspective of keypoint detection system 170 in FIG. 2. While method 500 is discussed in combination with keypoint detection system 170, it should be appreciated that method 500 is not limited to being implemented within keypoint detection system 170, but keypoint detection system 170 is instead one example of a system that may implement method 500.

At block 510, input preparation module 215 extracts a portion of an input image. As discussed above, in some embodiments, the input images used during both the training phase and the on-line operational phase are in RGB format. In some embodiments, the portion of the input image that input preparation module 215 extracts is randomly selected and may be termed a "random crop" of the input image.

At block 520, input preparation module 215 applies a transformation to the portion of the input image extracted in block 510 to produce a transformed portion of the input image. In some embodiments, the transformation includes rotation, color change, or both. In some embodiments, input preparation module 215 chooses the transformation randomly, but the random transformation that is ultimately applied is known (noted or retained by the system) so as to provide a ground-truth reference for the relationship between the original portion of the input image and its transformed counterpart, as discussed above.

At block 530, keypoint analysis module 220 processes the extracted portion of the input image and the transformed portion of the input image using the neural keypoint detection network 315 to identify one or more candidate keypoint pairs 355 between the portion of the input image and the transformed portion of the input image.

At block 540, outlier rejection module 225 processes the one or more candidate keypoint pairs 355 using an inlier-outlier neural network 360, the inlier-outlier neural network 360 producing an indirect supervisory signal (370) to train (e.g., during one or more subsequent passes through a training loop) the neural keypoint detection network 315 to identify one or more candidate keypoint pairs between the portion of the input image and the transformed portion of the input image. As discussed above, during the training phase, the indirect supervisory signal operates in conjunction with the three direct supervisory signals for keypoint location, descriptors, and quality scores.

In some embodiments, outlier rejection module 225 outputs a probability that a given candidate keypoint pair among the one or more candidate keypoint pairs belongs to an inlier set (i.e., a set of keypoint pairs that are deemed to match between the original extracted portion of the input image and the transformed version). In some embodiments, outlier rejection module 225 classifies candidate keypoint pairs 355 as belonging to the inlier set or to an outlier set, and the indirect supervisory signal (370) mentioned above includes the propagation of gradients from the classification of a given candidate keypoint pair as belonging to the inlier set or outlier set. In some embodiments, the inlier-outlier neural network 360 includes a one-dimensional CNN.

Figure 6:
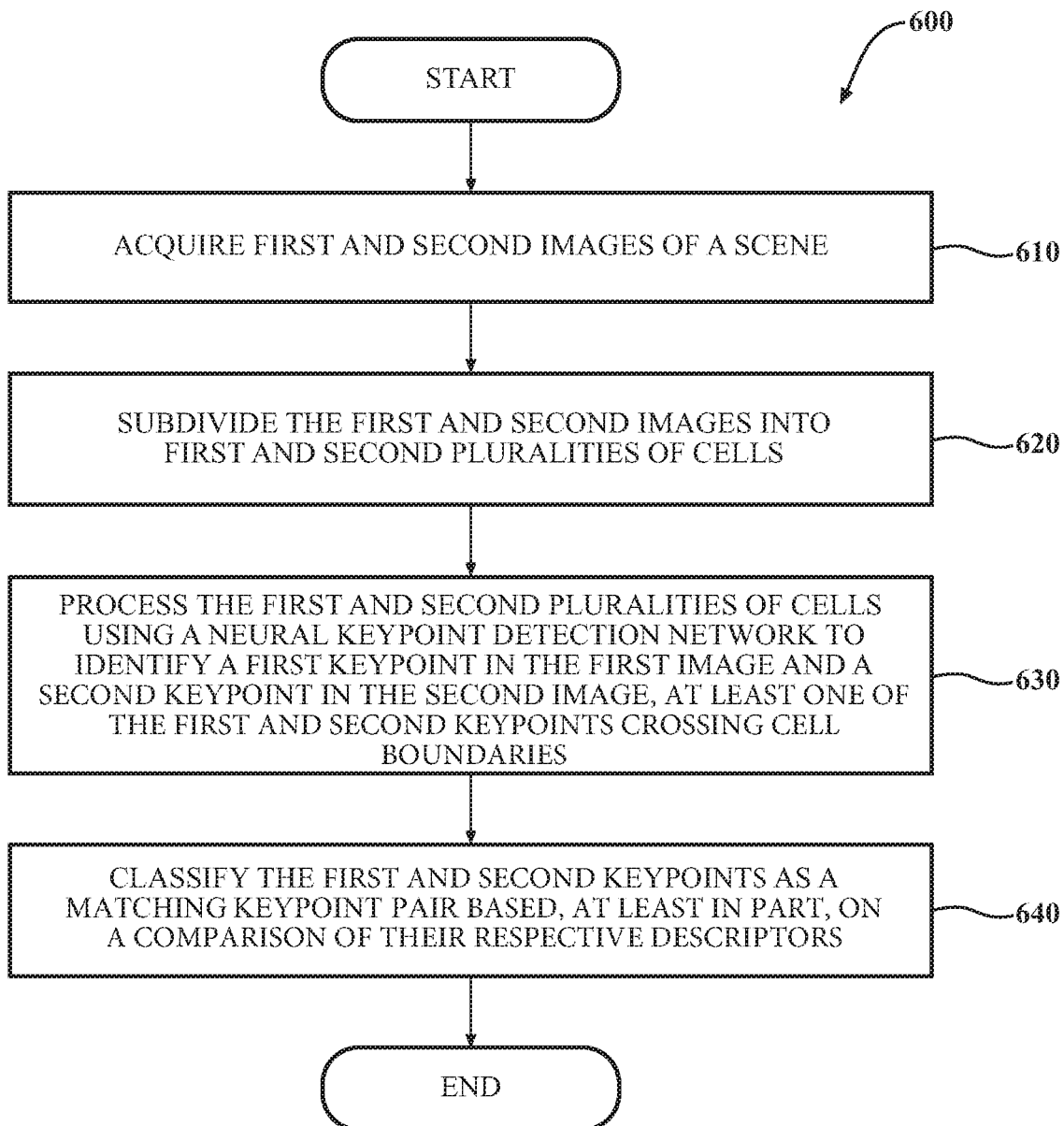
FIG. 6 is a flowchart of a method of detecting and matching keypoints between different views of a scene, in accordance with an illustrative embodiment of the invention.

FIG. 6 is a flowchart of a method 600 of detecting and matching keypoints between different views of a scene, in accordance with an illustrative embodiment of the invention. Method 600 will be discussed from the perspective of keypoint detection system 170 in FIG. 2. While method 600 is discussed in combination with keypoint detection system 170, it should be appreciated that method 600 is not limited to being implemented within keypoint detection system 170, but keypoint detection system 170 is instead one example of a system that may implement method 600.

At block 610, data encoding module 230 acquires a first image of a scene and a second image of the scene, the second image of the scene differing from the first image of the scene (e.g., the two images are taken at different times by the same camera from the same vantage point, or the images are taken by different cameras from different vantage points).

At block 620, data encoding module 230 subdivides the first image of the scene into a first plurality of cells. Data encoding module 230 also subdivides the second image of the scene into a second plurality of cells. Refer to the discussion of FIG. 4 above.

At block 630, keypoint analysis module 220 processes the first plurality of cells and the second plurality of cells using a neural keypoint detection network 315 to identify, for a particular cell in the first plurality of cells, a first keypoint within the first plurality of cells and to identify, for a particular cell in the second plurality of cells, a second keypoint in the second plurality of cells, wherein at least one of the first keypoint and the second keypoint lies in a cell other than the particular cell in the first or second plurality of cells for which it was identified. As discussed above in connection with FIG. 4, in some instances the keypoint identified for a given cell may lie in a different cell. How this crossing of cell boundaries by keypoints is permitted, in some embodiments, is described in detail above.

At block 640, keypoint analysis module 220 classifies the first keypoint and the second keypoint as a matching keypoint pair based, at least in part, on a comparison between a first descriptor 325 associated with the first keypoint and a second descriptor 325 associated with the second keypoint.

In some embodiments, method 600 can include additional actions not shown in FIG. 6. For example, in some embodiments, data encoding module 230 includes further instructions to encode the first image of the scene and the second image of the scene into a reduced-resolution embedding space to produce a first encoded image of the scene and a second encoded image of the scene, and the keypoint analysis module 220 includes further instructions to upsample the first encoded image of the scene and the second encoded image of the scene prior to regressing the first descriptor and the second descriptor, as discussed above. In some embodiments, the instructions in the keypoint analysis module 220 to identify the first keypoint within the particular cell in the first plurality of cells and to identify the second keypoint in the second plurality of cells include instructions to identify the first keypoint with respect to the center of the particular cell in the first plurality of cells and to identify the second keypoint with respect to the center of the particular cell in the second plurality of cells. Also, in some embodiments, the comparison between the first and second descriptors includes computing a Euclidian distance between the first descriptor and the second descriptor, as discussed above.

As mentioned above, the techniques and principles described herein have wide applicability to the fields of robotics and machine vision. As discussed above, these techniques and principles can be embodied in a vehicle (e.g., an autonomous vehicle) to support localization and mapping functions. They can also be embodied in other kinds of robots, including humanoid robots.

FIG. 1 will now be discussed in full detail as an example vehicle environment within which the systems and methods disclosed herein may be implemented. In some instances, the vehicle 100 can be configured to switch selectively between an autonomous mode, one or more semi-autonomous operational modes, and/or a manual mode. Such switching, also referred to as handover when transitioning to a manual mode, can be implemented in a suitable manner, now known or later developed. "Manual mode" means that all of or a majority of the navigation and/or maneuvering of the vehicle is performed according to inputs received from a user (e.g., human driver/operator).

In one or more implementations, the vehicle 100 can be an autonomous vehicle. As used herein, "autonomous vehicle" refers to a vehicle that operates in an autonomous mode. "Autonomous mode" refers to navigating and/or maneuvering a vehicle along a travel route using one or more computing devices to control the vehicle with minimal or no input from a human driver/operator. In one implementation, the vehicle 100 is configured with one or more semi-autonomous operational modes in which one or more computing devices perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. Thus, in one or more implementations, the vehicle 100 operates autonomously according to a particular defined level of autonomy.

The vehicle 100 can include one or more processors 110. In one or more arrangements, the one or more processors 110 can be a main processor of the vehicle 100. For instance, the one or more processors 110 can be an electronic control unit (ECU). The vehicle 100 can include one or more data stores 115 for storing one or more types of data. The data store(s) 115 can include volatile and/or non-volatile memory. Examples of suitable data stores 115 include RAM, flash memory, ROM, PROM (Programmable Read-Only Memory), EPROM, EEPROM (Electrically Erasable Programmable Read-Only Memory), registers, magnetic disks, optical disks, hard drives, or any other suitable storage medium, or any combination thereof. The data store(s) 115 can be a component(s) of the one or more processors 110, or the data store(s) 115 can be operatively connected to the one or more processors 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. In one or more arrangement, the map data 116 can include one or more terrain maps 117. The terrain map(s) 117 can include information about the ground, terrain, roads, surfaces, and/or other features of one or more geographic areas. In one or more arrangement, the map data 116 can include one or more static obstacle maps 118. The static obstacle map(s) 118 can include information about one or more static obstacles located within one or more geographic areas.

The one or more data stores 115 can include sensor data 119. In this context, "sensor data" means any information about the sensors that a vehicle is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120. As discussed above, in some embodiments, vehicle 100 can receive sensor data from other connected vehicles, from devices associated with ORUs, or both.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operatively connected to the one or more processors 110, the data store(s) 115, and/or another element of the vehicle 100 (including any of the elements shown in FIG. 1).

The sensor system 120 can include any suitable type of sensor. Various examples of different types of sensors will be described herein. However, it will be understood that the implementations are not limited to the particular sensors described. The sensor system 120 can include one or more vehicle sensors 121. The vehicle sensors 121 can detect, determine, and/or sense information about the vehicle 100 itself, including the operational status of various vehicle components and systems.

In one or more arrangements, the vehicle sensors 121 can be configured to detect, and/or sense position and/or orientation changes of the vehicle 100, such as, for example, based on inertial acceleration. In one or more arrangements, the vehicle sensors 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensors 121 can be configured to detect, and/or sense one or more characteristics of the vehicle 100. In one or more arrangements, the vehicle sensors 121 can include a speedometer to determine a current speed of the vehicle 100.

Alternatively, or in addition, the sensor system 120 can include one or more environment sensors 122 configured to acquire, and/or sense driving environment data. "Driving environment data" includes any data or information about the external environment in which a vehicle is located or one or more portions thereof. For example, the one or more environment sensors 122 can be configured to detect, quantify, and/or sense obstacles in at least a portion of the external environment of the vehicle 100 and/or information/data about such obstacles. The one or more environment sensors 122 can be configured to detect, measure, quantify, and/or sense other things in at least a portion the external environment of the vehicle 100, such as, for example, nearby vehicles, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the implementations are not limited to the particular sensors described. As an example, in one or more arrangements, the sensor system 120 can include one or more radar sensors 123, one or more LIDAR sensors 124, one or more sonar sensors 125, and/or one or more cameras 126.

The vehicle 100 can further include a communication system 130. The communication system 130 can include one or more components configured to facilitate communication between the vehicle 100 and one or more communication sources. Communication sources, as used herein, refers to people or devices with which the vehicle 100 can communicate with, such as external networks, computing devices, operator or occupants of the vehicle 100, or others. As part of the communication system 130, the vehicle 100 can include an input system 131. An "input system" includes any device, component, system, element or arrangement or groups thereof that enable information/data to be entered into a machine. In one or more examples, the input system 131 can receive an input from a vehicle occupant (e.g., a driver or a passenger). The vehicle 100 can include an output system 132. An "output system" includes any device, component, or arrangement or groups thereof that enable information/data to be presented to the one or more communication sources (e.g., a person, a vehicle passenger, etc.). The communication system 130 can further include specific elements which are part of or can interact with the input system 131 or the output system 132, such as one or more display device(s) 133, and one or more audio device(s) 134 (e.g., speakers and microphones).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combinations thereof, now known or later developed.

The one or more processors 110 and/or the autonomous driving module(s) 160 can be operatively connected to communicate with the various vehicle systems 140 and/or individual components thereof. For example, returning to FIG. 1, the one or more processors 110 and/or the autonomous driving module(s) 160 can be in communication to send and/or receive information from the various vehicle systems 140 to control the movement, speed, maneuvering, heading, direction, etc. of the vehicle 100. The one or more processors 110 and/or the autonomous driving module(s) 160 may control some or all of these vehicle systems 140 and, thus, may be partially or fully autonomous.

The vehicle 100 can include one or more modules, at least some of which are described herein. The modules can be implemented as computer-readable program code that, when executed by a processor 110, implement one or more of the various processes described herein. The processor 110 can be a device, such as a CPU, which is capable of receiving and executing one or more threads of instructions for the purpose of performing a task. One or more of the modules can be a component of the one or more processors 110, or one or more of the modules can be executed on and/or distributed among other processing systems to which the one or more processors 110 is operatively connected. The modules can include instructions (e.g., program logic) executable by one or more processors 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

In some implementations, the vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine the position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140). The noted functions and methods will become more apparent with a further discussion of the figures.

Detailed implementations are disclosed herein. However, it is to be understood that the disclosed implementations are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various implementations are shown in FIGS. 1-6, but the implementations are not limited to the illustrated structure or application.

The flowcharts and block diagrams in the figures illustrate the architecture, functionality, and operation of possible implementations of systems, methods, and computer program products according to various implementations. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the implementation of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a RAM, a ROM, an EPROM or Flash memory, an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by, or in connection with, an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™ Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a LAN or a WAN, or the connection can be made to an external computer (for example, through the Internet using an Internet Service Provider).

In the description above, certain specific details are outlined in order to provide a thorough understanding of various implementations. However, one skilled in the art will understand that the invention may be practiced without these details. In other instances, well-known structures have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one or more implementations" or "an implementation" means that a particular feature, structure or characteristic described in connection with the implementation is included in at least one or more implementations. Thus, the appearances of the phrases "in one or more implementations" or "in an implementation" in various places throughout this specification are not necessarily all referring to the same implementation. Furthermore, the particular features, structures, or characteristics may be combined in any suitable manner in one or more implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an implementation or particular system is included in at least one or more implementations or aspect. The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure. Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure.

While the preceding is directed to implementations of the disclosed devices, systems, and methods, other and further implementations of the disclosed devices, systems, and methods can be devised without departing from the basic scope thereof. The scope thereof is determined by the claims that follow.

What is claimed is:

1. A system for training a neural keypoint detection network, the system comprising:
   one or more processors; and
   a memory communicably coupled to the one or more processors and storing:
   an input preparation module including instructions that when executed by the one or more processors cause the one or more processors to:
      extract a portion of an input image; and
      apply a transformation to the portion of the input image to produce a transformed portion of the input image;
   a keypoint analysis module including instructions that when executed by the one or more processors cause the one or more processors to process the portion of the input image and the transformed portion of the input image using the neural keypoint detection network to identify one or more candidate keypoint pairs between the portion of the input image and the transformed portion of the input image; and
   an outlier rejection module including instructions that when executed by the one or more processors cause the one or more processors to process the one or more candidate keypoint pairs using an inlier-outlier neural network, the inlier-outlier neural network producing an indirect supervisory signal to train the neural keypoint detection network to identify one or more candidate keypoint pairs between the portion of the input image and the transformed portion of the input image.

2. The system of claim 1, wherein the instructions in the outlier rejection module to process the one or more candidate keypoint pairs using the inlier-outlier neural network include instructions to output, from the inlier-outlier neural network, a probability that a given candidate keypoint pair among the one or more candidate keypoint pairs belongs to an inlier set.

3. The system of claim 2, wherein the instructions in the outlier rejection module to process the one or more candidate keypoint pairs using the inlier-outlier neural network include further instructions to classify the given candidate keypoint pair as belonging to the inlier set and the indirect supervisory signal includes propagation of gradients from classification of the given candidate keypoint pair as belonging to the inlier set.

4. The system of claim 1, wherein the instructions in the input preparation module to extract the portion of the input image include instructions to extract the portion of the input image randomly and the transformation is a known random transformation that includes at least one of rotation and color change.

5. The system of claim 1, wherein the inlier-outlier neural network includes a one-dimensional convolutional neural network.

6. The system of claim 1, further comprising a training module including instructions that when executed by the one or more processors cause the one or more processors to constrain identification of the one or more candidate keypoint pairs using three direct supervisory signals that include a keypoint-location loss function, a keypoint-descriptor loss function, and a keypoint-quality-score loss function.

7. The system of claim 1, wherein the input image is in a red-green-blue (RGB) format.

8. A non-transitory computer-readable medium for training a neural keypoint detection network and storing instructions that when executed by one or more processors cause the one or more processors to:
    extract a portion of an input image;
    apply a transformation to the portion of the input image to produce a transformed portion of the input image;
    process the portion of the input image and the transformed portion of the input image using the neural keypoint detection network to identify one or more candidate keypoint pairs between the portion of the input image and the transformed portion of the input image; and
    process the one or more candidate keypoint pairs using an inlier-outlier neural network, the inlier-outlier neural network producing an indirect supervisory signal to train the neural keypoint detection network to identify one or more candidate keypoint pairs between the portion of the input image and the transformed portion of the input image.

9. The non-transitory computer-readable medium of claim 8, wherein the instructions to process the one or more candidate keypoint pairs using the inlier-outlier neural network include instructions to output, from the inlier-outlier neural network, a probability that a given candidate keypoint pair among the one or more candidate keypoint pairs belongs to an inlier set.

10. The non-transitory computer-readable medium of claim 9, wherein the instructions to process the one or more candidate keypoint pairs using the inlier-outlier neural network include further instructions to classify the given candidate keypoint pair as belonging to the inlier set and the indirect supervisory signal includes propagation of gradients from classification of the given candidate keypoint pair as belonging to the inlier set.

11. The non-transitory computer-readable medium of claim 8, wherein the instructions to extract the portion of the input image include instructions to extract the portion of the input image randomly and the transformation is a known random transformation that includes at least one of rotation and color change.

12. The non-transitory computer-readable medium of claim 8, wherein the inlier-outlier neural network includes a one-dimensional convolutional neural network.

13. The non-transitory computer-readable medium of claim 8, further comprising instructions to constrain identification of the one or more candidate keypoint pairs using three direct supervisory signals that include a keypoint-location loss function, a keypoint-descriptor loss function, and a keypoint-quality-score loss function.

14. A method of training a neural keypoint detection network, the method comprising:
    extracting a portion of an input image;
    applying a transformation to the portion of the input image to produce a transformed portion of the input image;
    processing the portion of the input image and the transformed portion of the input image using the neural keypoint detection network to identify one or more candidate keypoint pairs between the portion of the input image and the transformed portion of the input image; and
    processing the one or more candidate keypoint pairs using an inlier-outlier neural network, the inlier-outlier neural network producing an indirect supervisory signal to train the neural keypoint detection network to identify one or more candidate keypoint pairs between the portion of the input image and the transformed portion of the input image.

15. The method of claim 14, wherein the inlier-outlier neural network outputs a probability that a given candidate keypoint pair among the one or more candidate keypoint pairs belongs to an inlier set.

16. The method of claim 15, further comprising classifying the given candidate keypoint pair as belonging to the inlier set, wherein the indirect supervisory signal includes propagating gradients from the classifying the given candidate keypoint pair as belonging to the inlier set.

17. The method of claim 14, wherein the portion of the input image is extracted randomly and the transformation is a known random transformation that includes at least one of rotation and color change.

18. The method of claim 14, wherein the inlier-outlier neural network includes a one-dimensional convolutional neural network.

19. The method of claim 14, wherein the processing the portion of the input image and the transformed portion of the input image using the neural keypoint detection network to identify the one or more candidate keypoint pairs between the portion of the input image and the transformed portion of the input image is constrained by three direct supervisory signals that include a keypoint-location loss function, a keypoint-descriptor loss function, and a keypoint-quality-score loss function.

20. The method of claim 14, wherein the input image is in a red-green-blue (RGB) format.

* * * * *